United States Patent [19]

Grohmann et al.

[11] Patent Number: 5,560,525
[45] Date of Patent: Oct. 1, 1996

[54] LOAD CARRIER

[75] Inventors: Hubert Grohmann, Gislaved; Magnus Christiansson, Bondarp, both of Sweden

[73] Assignee: Industri AB Thule, Hillerstorp, Sweden

[21] Appl. No.: 245,637

[22] Filed: May 18, 1994

[30] Foreign Application Priority Data

Nov. 18, 1991 [SE] Sweden .................. 9103400

[51] Int. Cl.$^6$ .............................. B60R 9/00; B60R 9/042
[52] U.S. Cl. .................... 224/310; 224/309; 224/282; 224/488; 224/495; 224/502; 224/505; 224/507; 224/319; 224/325; 414/462
[58] Field of Search .................... 224/310, 321, 224/309, 42.03 R, 281, 282, 29.5, 42.06, 42.07, 42.08, 319, 325, 329, 330, 331; 414/462, 466

[56] References Cited

U.S. PATENT DOCUMENTS

| 2,521,815 | 9/1950 | Will | 224/42.03 R |
|---|---|---|---|
| 2,885,102 | 5/1959 | Duncan | 414/462 |
| 3,531,006 | 9/1970 | Farchmin | 414/462 |
| 3,720,358 | 3/1973 | McIntire | 224/492 |
| 3,777,922 | 12/1973 | Kirchmeyer | 414/462 |
| 4,291,823 | 9/1981 | Freeman et al. | 224/310 |
| 4,350,471 | 9/1982 | Lehmann | 224/310 |
| 4,406,384 | 9/1983 | Schantz | 224/42.03 R |

*Primary Examiner*—Henry J. Recla
*Assistant Examiner*—Timothy L. Maust
*Attorney, Agent, or Firm*—Novak, Druce, Reynolds & Burt

[57] ABSTRACT

A load carrier arrangement for mounting a load holder on a vehicle. The vehicle includes a roof and a rear door and/or a trunk lid. The load carrier includes a rack disposed across the roof of the vehicle and fastened at a rear portion thereof. A carrier device having the load holder for carrying a load behind the vehicle in a load carrying position of the carrier device is also provided. The carrier device is pivotally arranged about a substantially horizontal pivot axis directed transversely to the longitudinal direction of the carrier vehicle. The pivot-arrangement connecting the carrier device to the rack allows the carrier device and a load holder to be pivoted upwardly from the load carrying position to an elevated position not interfering with the opening of the rear door and/or the trunk lid.

21 Claims, 2 Drawing Sheets

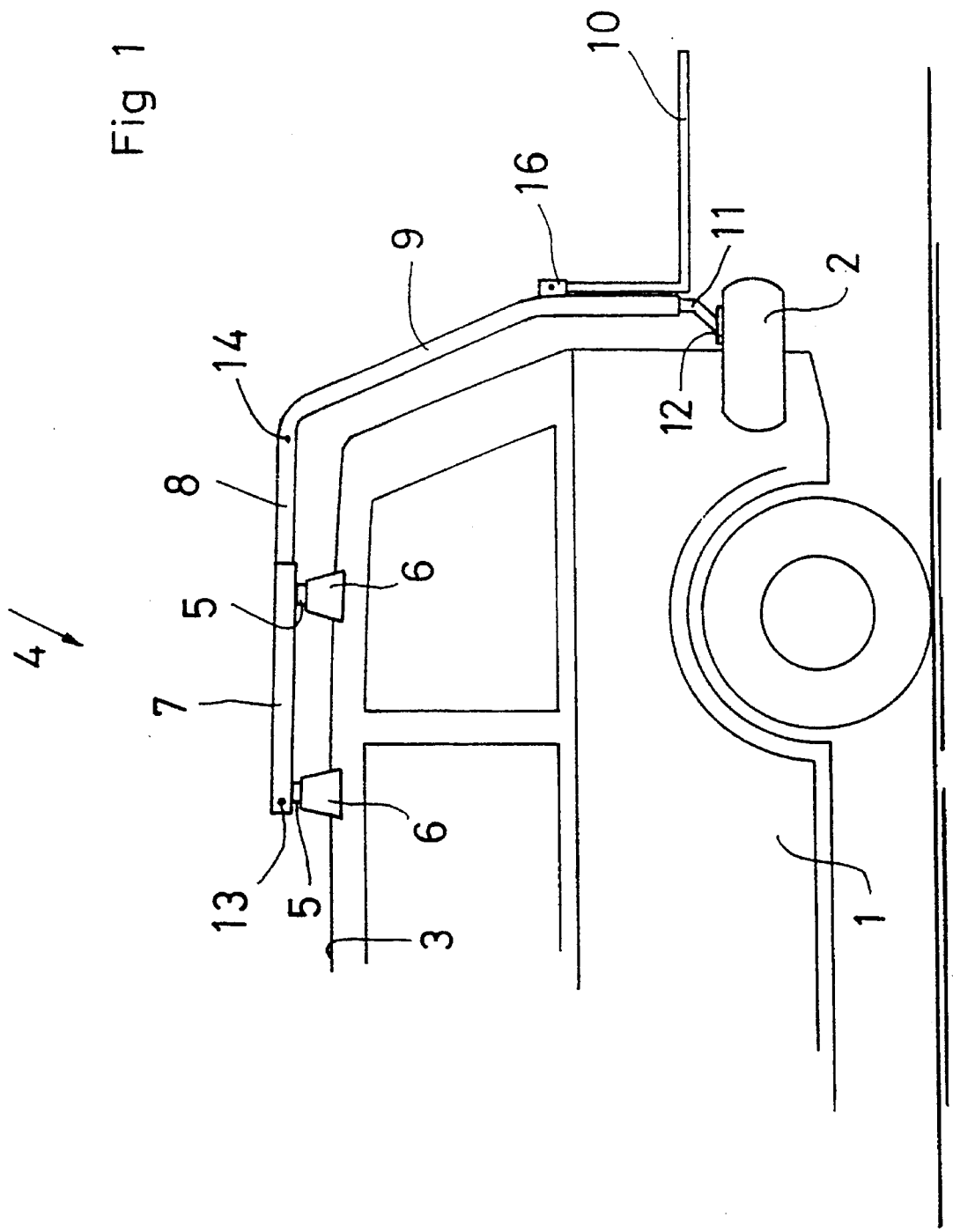

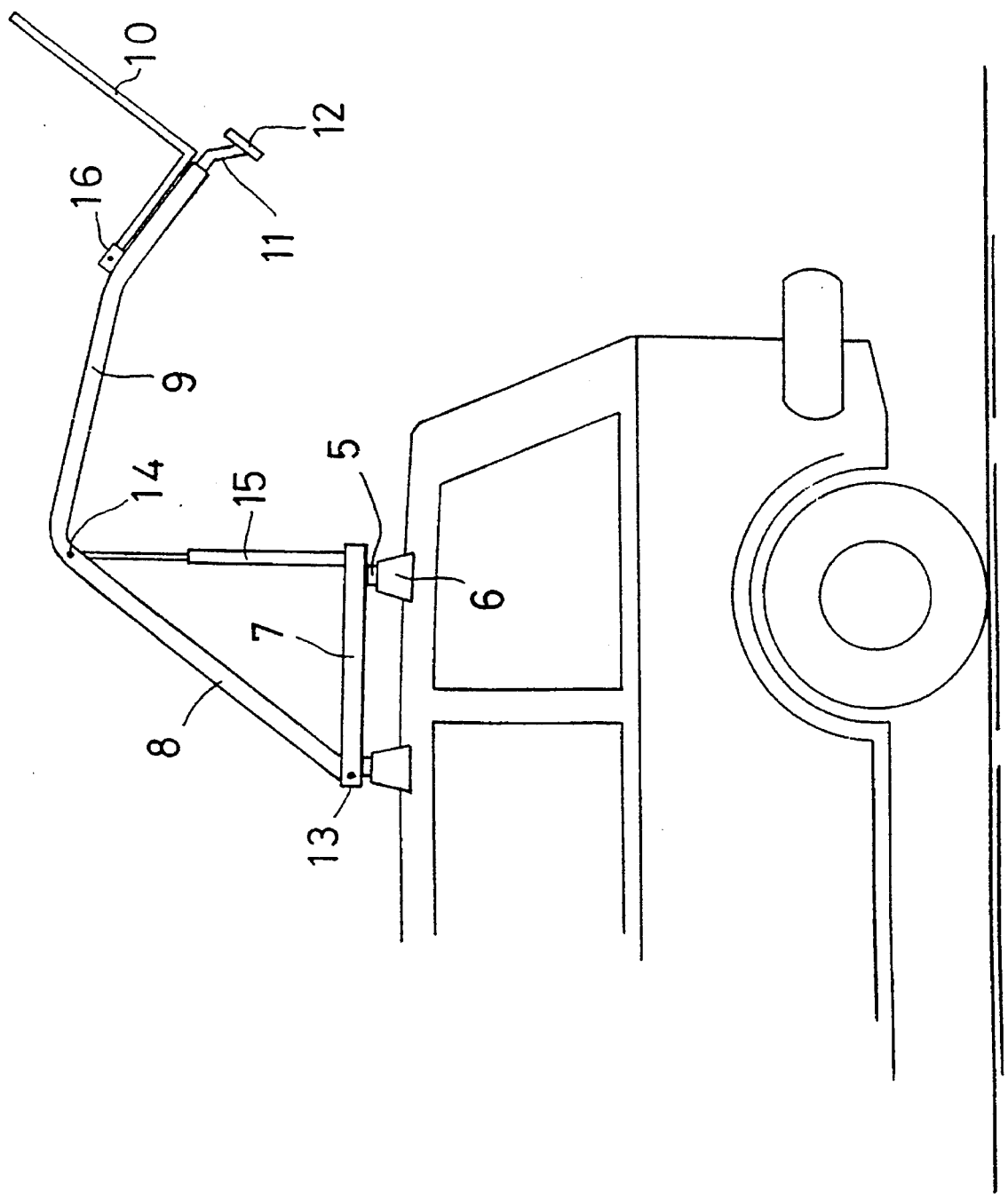

LOAD CARRIER

TECHNICAL FIELD

The present invention relates to a load carrier with a load holder disposed behind a vehicle and carried on or forming a part of a carrier device disposed behind the vehicle.

BACKGROUND ART

Fixedly mounted load carriers of the type mentioned by way of introduction are previously known in the art. With such a load carrier in place, the rear door or rear hatch of the vehicle cannot be opened without the load carrier being dismounted.

In addition, holders or brackets for different types of loads such as spare wheels, petrol cans etc. have previously been secured directly to the rear hatch, boot lid or rear door of the vehicle. Load carriers pure and simple, designed for such mounting are also known in the art. With a holder or load carrier mounted in this manner, the load carrying capacity (or payload) will be extremely limited if the hinges and lock of the door or hatch are not to be overloaded and seriously damaged.

It is also previously known in the art to provide load carriers which are pivotally secured along one side of the vehicle so that they can be laterally swung out of the way when the rear hatch or rear door of the vehicle is to be opened. With this type of load carrier, special reinforcements are often required to the vehicle body where the load carrier is secured, since the oblique loading involved may become considerable.

PROBLEM STRUCTURE

The present invention has for its object to realize a load carrier of the type mentioned by way of introduction, the load carrier being designed in such a manner that it may readily be removed from that area which must be free for opening of the rear door or rear hatch of the vehicle.

The present invention further has for its object to realize a load carrier which, in a simple manner, may be secured on the vehicle without any physical modifications to the vehicle. Finally, the present invention has for its object to realize a load carrier which possesses superior load carrying capacity, which does not locally overload the vehicle body or its rear hatch or rear door, respectively, nor their hinges and locks, and which, moreover, is flexible for adaptation to a plurality of different vehicle types.

SOLUTION

The objects forming the basis of the present invention will be attained if the load carrier disclosed by way of introduction is characterized in that the carrier device has at least one but preferably two arms which extend up over the vehicle roof and which are, about a pivot shaft, pivotally secured in a rack disposed across the vehicle roof, the pivot shaft being substantially horizontal and transversely directed in relation to the longitudinal direction of the vehicle, whereby the carrier device with the load holder is pivotal upwards.

According to one preferred embodiment of the present invention, the carrier device or load holder is suitably also provided with support members for abutment against a rear portion of the vehicle, preferably its bumper or fender.

As a result of these distinguishing features, a load carrier will be realized which may readily be fixed to the vehicle roof with the aid of conventional roof racks. The advantage inherent in this arrangement is, on the one hand, the use of standard components, and, on the other hand, a superior load carrying capacity. The load carrying capacity will be further increased by employment of the support members against the bumper or fender of the vehicle.

Further advantages will be attained according to the present invention if the subject matter thereof is also given one or more of the characterizing features as set forth in appended Claims 3 to 9.

BRIEF DESCRIPTION OF THE ACCOMPANYING DRAWINGS

The present invention will now be described in greater detail hereinbelow, with particular reference to the accompanying Drawings. In the accompanying Drawings:

FIG. 1 shows a rear portion of a vehicle, with the load carrier according to the present invention mounted in the position of use; and FIG. 2 is a view corresponding to that of FIG. 1, in which the load carrier has, however, been raised for access to the rear door of the vehicle.

DESCRIPTION OF PREFERRED EMBODIMENT

In FIG. 1, reference numeral 1 designates a vehicle which may be of the estate wagon type, a van or minibus and in which it is important that the rear door or rear hatch of the vehicle may be readily accessible. The vehicle 1 has a bumper or fender 2 and a roof 3.

On the roof 3 of the vehicle, there is disposed a rack 4 which includes two load struts 5 preferably of conventional type which extend over the vehicle roof 3. The load struts have feet 6 by means of which the rack 4 is secured along the side edges of the vehicle roof 3, possibly in the drip guttering (if any). Under any circumstances, vehicles of this type are approved for relatively large roof loads and there are, therefore, possibilities of securing, in a dependable manner, the feet of the rack and via these transferring a loading to the vehicle.

Furthermore, the rack 4 has preferably parallel rails 7 which extend in the longitudinal direction of the vehicle and which are secured on the load struts 5. The rails 7 may have U-shaped cross sections and be open upwardly in order to accommodate, between their shanks, arms 8 which extend in the longitudinal direction of the vehicle and which are secured in or constitute a part of a carrier device 9 which in its turn mounts the load holder 10 proper. In the illustrated embodiment, the holder is designed as a load platform on which a load can be placed. Naturally, the load holder may, however, also consist of a holder which is specifically designed for mounting one or more bicycles, a rack for skis or the like.

In the illustrated embodiment, the carrier device 9 is of one piece construction with the arms 8 extending forwardly over the roof of the vehicle.

In the lower end of the carrier device 9, this is provided with downwardly directed, substantially vertical tubes in which support members 11 are telescopically housed so as to permit vertical adjustment. The support members are intended to abut against the vehicle, possibly its rear wall, but preferably its rear bumper or fender 2. Hereby, large loads can be carried by the load holder 10. The support member 11 is further provided, in laterally angled portions, with abutments 12 in the lower end or placed and directed for abutment against the rear wall of the vehicle. As a result of this design, and given that the support members are both vertically adjustable and rotary about the substantially vertical axis which forms the lower end of the carrier device 9, the position of the abutments 12 can be set so as to suit a large number of vehicle types and models. In particular, by rotating the support member 11, it is possible to adapt the position of the abutments in the longitudinal direction of the vehicle in that the angled portions extend outwardly in a lateral direction from the carrier device 9.

The two forwardly directed arms 8 are secured in the forward ends of the rails 7, pivotal about a pivot shaft 13 which is substantially horizontal and transversely directed in relation to the longitudinal direction of the vehicle, preferably at right angles thereto. Hereby, the carrier device 9 is pivotal about this pivot shaft and can, therefore, be swung upwardly as is apparent from FIG. 2. In the pivotal position illustrated in FIG. 2, the space behind the rear wall of the vehicle is free, so that a wall or hatch situated there is accessible without any hindrance by the load carrier.

According to the invention, there is disposed, in the transitional region between the arms 8 and the portion of the carrier device 9 placed behind the vehicle, an anchorage point 14 for spring means 15. In the embodiment shown on the Drawings, the spring means 15 consist of gas springs which are placed on the insides of the arms 8 extending over the roof, and which, with their forward ends, are secured in the proximity of the rear end of the two rails 7. Possibly, the forward ends of the gas springs can also be secured in the rear load strut 5. The gas springs 15 are further disposed in such a manner that a line through the anchorage points of the gas spring will also pass through the pivot shaft 13 or in its immediate proximity. With this geometric relationship, the gas springs 15 will not exercise any lifting force against the load carrier when this is located in the downwardly pivoted position of use, as shown in FIG. 1.

On the other hand, the lifting action of the gas springs 15 on the load carrier will rapidly increase when this is pivoted a short distance up from the position illustrated in FIG. 1.

It might possibly also be conceivable to place the forward anchorage points of the gas springs 15 at some distance over the line of intersection between the rear anchorage points 14 of the gas springs and the pivot shaft 13. With such a placement of the gas springs, these would press the load carrier in a downward direction in the position of use illustrated in FIG. 1.

The carrier device 9 has anchorages 16 by means of which the load holder 10 is properly secured. These anchorages are preferably displaceable in an upward and downward direction along the carrier device 9 and are further designed in such a manner that the load holder 10 may be pivoted from the position of use shown on the Drawing to a raised position where it is located adjacent or along the carrier device 9.

In order to ensure that the load carrier according to the present invention does not bounce up and down when the vehicle is negotiating an uneven road surface, the carrier device 9 or the support members 11 are further provided with suitable catch members for hooking in, for example, the bumper or fender 2 such that the load carrier is prevented from pivoting upwardly towards the position illustrated in FIG. 2.

DESCRIPTION OF ALTERNATIVE EMBODIMENTS

In the above description, it has been presupposed that two gas springs 15 are employed, one on either side of the carrier device 9. According to the present invention, this is not necessary, it being also possible to provide the carrier device 9. In the region of the anchorage points 14 with a transverse stay or tube in whose centre point the rear end of a single gas spring is fixed. The forward end of this spring is then fixed in the central region of the rear load strut 5.

Instead of using two support members 11, it is possible to employ a single such support member in the central region of the carrier device 9. Such a single support member can then be designed either for cooperation with the vehicle as described above, or for securing on the ball of a drawbar hitch if the vehicle is provided with such an accessory.

The present invention can be further modified without departing from the spirit and scope of the appended Claims.

What is claimed is:

1. A load carrier with a load holder adapted to be mounted behind a vehicle and being a part of a carrier device disposed behind the vehicle, the carrier device having at least one arm which extends up over the vehicle roof and which is, about a pivot shaft, pivotally secured in a rack disposed across the roof of the vehicle, the pivot shaft being substantially horizontal and transversely directed in relation to the longitudinal direction of the vehicle, the carrier device with the load holder being pivotal upwards, one of the carrier device and the holder having support members rotatably mounted therein for abutment against a rear portion of the vehicle, the support members being rotatable with respect to said one of said carrier device and said holder about a generally vertical axis when the load carrier is located behind the vehicle; and the support members having angled portions which are provided with portions intended for abutment of the support members against the vehicle.

2. The load carrier as claimed in 1, wherein the support members are raisably and lowerably secured in the one of said carrier device and said holder relative to the vehicle.

3. A load carrier arrangement for a load holder which is adapted to be mounted on a vehicle, the vehicle having a roof and one of a rear door and a trunk lid, comprising:

a rack disposed across the roof of the vehicle and fastened at a rear portion thereof;

a carrier device including the load holder for carrying a load behind the vehicle in a load carrying position of the carrier device: and a pivot arrangement having a substantially horizontal pivot axis directed transversely in relation to the longitudinal direction of the vehicle, said pivot arrangement connecting the carrier device to the rack so that the carrier device and the load holder pivot upwardly from the load carrying position to an elevated position not interfering with the opening of the rear door and the trunk lid;

the rack including at least one forward and rear strut extending over the vehicle roof, the at least one strut being mutually interconnected in the longitudinal direction of the vehicle via at least one longitudinal portion.

4. A load carrier arrangement for a load holder which is adapted to be mounted on a vehicle, the vehicle having a roof and one of a rear door and a trunk lid, comprising:

a rack disposed across the roof of the vehicle and fastened at a rear portion thereof;

a carrier device including the load holder for carrying a load behind the vehicle in a load carrying position of the carrier device; and a pivot arrangement having a substantially horizontal pivot axis directed transversely in relation to the longitudinal direction of the vehicle, said pivot arrangement connecting the carrier device to the rack so that the carrier device and the load holder pivot upwardly from the load carrying position to an elevated position not interfering with the opening of the rear door and the trunk lid;

the carrier device further including at least one arm that extends from behind up over the rear portion of the vehicle roof, said at least one arm being pivotably connected to the rack, a forward end of the at least one arm being pivotably connected to the rack;

the rack including at least one rail extending in the longitudinal direction of the vehicle, said at least one arm being provided and being connected to said forward end of said at least one rail and at least partially received in said at least one rail in the load carrying position of the carrier device and the holder; and spring means acting between the rack and the carrier device for holding the carrier device in the load carrying position.

5. A load carrier arrangement for mounting a load holder on a vehicle, said vehicle having a roof and a rear door or a trunk lid comprising:

a rack disposed across the roof of the vehicle said rack being fastened to the vehicle;

a carrier device having the load holder for carrying a load behind the vehicle in a load carrying position of the carrier device;

a pivot arrangement connecting the carrier device to the rack to permit the carrier device and the load holder to be pivoted upwardly from the load carrying position to a temporary, elevated position for permitting opening of the rear door or the trunk lid of the vehicle; and spring means acting between the rack and the carrier device for holding the carrier device in the temporary, elevated position.

6. A load carrier arrangement as claimed in claim 5, wherein the carrier device comprises at least one arm that extends from behind up over the rear portion of the vehicle roof, said arm being pivotably connected to the rack.

7. The load carrier as claimed in claim 5, wherein one of the carrier device or the holder support members is arranged for abutment against a rear portion of the vehicle.

8. A load carrier arrangement for mounting a load holder on a vehicle, said vehicle having a roof and a rear door or a trunk lid, comprising:

a rack disposed across the roof of the vehicle said rack being fastened to the vehicle;

a carrier device having the load holder for carrying a carrying a load behind the vehicle in a load carrying position of the carrier device;

a pivot arrangement connecting the carrier device to the rack to permit the carrier device and the load holder to be pivoted upwardly from the load carrying position to an elevated position not interfering with the opening of the rear door or the trunk lid of the vehicle; and spring means acting between the rack and the carrier device for holding the carrier device in the elevated position;

the carrier device comprising at least one arm that extends from behind up over the rear portion of the vehicle roof, said arm being pivotably connected to the rack; and said rack including at least one rail extending in the longitudinal direction of the vehicle, at least one arm being provided, said at least one rail having upwardly open recesses for receiving, in the load carrying position of the carrier device, a front end portion of at least one arm.

9. A load carrier arrangement for a load holder which is adapted to be mounted on a vehicle, the vehicle having a roof and one of a rear door and a trunk lid, comprising:

a rack disposed across the roof of the vehicle and fastened at a rear portion thereof;

a carrier device including the load holder for carrying a load behind the vehicle in a load carrying position of the carrier device;

a pivot arrangement having a substantially horizontal pivot axis directed transversely in relation to the longitudinal direction of the vehicle, said pivot arrangement connecting the carrier device to the rack so that the carrier device and the load holder can be pivoted upwardly from the loads carrying position to an elevated position not interfering with the opening of the rear door and the trunk lid;

spring means, disposed between a portion of the rack located behind the pivot shaft and one of the arms of the load carrier and the support member, said spring means being arranged to hold the carrier device in its raised position;

the spring means being arranged such that, when the carrier device is pivoted downwardly, a line through the anchorage points of said spring means passes through the plane of the pivot shaft.

10. A load carrier arrangement for mounting a load holder on a vehicle, said vehicle having a roof and a rear door or a trunk lid, comprising:

a rack disposed across the roof of the vehicle, said rack being fastened to the vehicle;

a carrier device having the load holder for carrying a load behind the vehicle in a load carrying position of the carrier device;

a pivot arrangement connecting the carrier device to the rack, the carrier device and the load holder being pivotal upwardly from the downward load carrying position behind the vehicle to an elevated position not interfering with the opening of the rear door or the trunk lid; and spring means acting between the rack and the carrier device for holding the carrier device in the downward load carrying position.

11. A load carrier arrangement as claimed in claim 10, wherein the carrier device comprises at least one arm that extends from behind up over the rear portion of the vehicle roof, said at least one arm being pivotably connected to the rack.

12. A load carrier arrangement as claimed in claim 11, wherein said rack comprises rails extending in the longitudinal direction of the vehicle, two arms being provided, said rails having upwardly open recesses for receiving, in the load carrying position of the carrier device, at least partially front end portions of respective ones of said arms.

13. The load carrier as claimed in claim 10, wherein one of the carrier device or the holder support members is arranged for abutment against a rear portion of the vehicle.

14. A load carrier arrangement for mounting a load holder on a vehicle, said vehicle having a roof and a rear door or a trunk lid, comprising;

a rack disposed across the roof of the vehicle, said rack being fastened to the vehicle;

a carrier device having the load holder for carrying a load behind the vehicle in a load carrying position of the carrier device;

a generally horizontal pivot arrangement connecting the carrier device to the rack, the carrier device and the load holder being pivotal upwardly from the downward load carrying position to an elevated position not interfering with the opening of the rear door or the trunk lid;

spring means acting between the rack and the carrier device for holding the carrier device in the load carrying position; and said spring means arranged such that, when the carrier device is pivoted downwardly, a line through anchorage points of said spring means passes through a plane of the pivot arrangement.

15. A load carrier arrangement for mounting a load holder on a vehicle, said vehicle having a roof and a rear door or a trunk lid, comprising:

a rack disposed across the roof of the vehicle, said rack being fastened to the vehicle;

a carrier device having that load holder for carrying a load behind the vehicle in a load carrying position of the carrier device;

a pivot arrangement connecting the carrier device to the rack, the carrier device and the load holder being pivotal upwardly from the load carrying position to an elevated position not interfering with the opening of the rear door or the trunk lid;

spring means acting between the rack and the carrier device for holding the carrier device in the load carrying position; and said rack comprising at least one rail extending in the longitudinal direction of the vehicle, at least one arm being provided, said at least one rail having upwardly open recesses for receiving, in the load carrying position of the carrier device, at least partially a front end portion of said at least one arm.

16. A load carrier arrangement for mounting a load holder on a vehicle, said vehicle having a roof and a rear door or a trunk lid, comprising:

a rack disposed across the roof of the vehicle, said rack being fastened to the vehicle;

a carrier device having the load holder for carrying a load behind the vehicle;

a carrier device having the load holder for carrying a load behind the vehicle in a load carrying position of the carrier device;

a pivot arrangement connecting to the rack, the carrier device to the rack, the carrier device and the load holder being pivotal upwardly from the load carrying position to an elevated position not interfering with the opening of the rear door or the trunk lid; and spring means provided for holding the carrier device in the load carrying position of the carrier device, for assisting in the upward pivotal movement of the load carrier once this movement has passed the lowermost portion thereof and for holding the carrier device in the elevated position.

17. A load carrier arrangement as claimed in claim 16, wherein the carrier device comprises at least one arm that extends from behind up over the rear portion of the vehicle roof, said arm being pivotably connected to the rack.

18. The load carrier as claimed in claim 16, wherein the holder is, about a substantially horizontal axis, pivotally secured in the carrier device whereby it is pivotal between an approximately horizontal position projecting from the carrier device, and a raised position along the carrier device.

19. The load carrier as claimed in claim 16, wherein the rack is connected to side edge portions of the roof of the vehicle and extends freely bearing over the roof.

20. A load carrier arrangement for mounting a load holder on a vehicle, said vehicle having a roof and a rear door or a trunk lid, comprising:

a rack disposed across the roof of the vehicle, said rack being fastened to the vehicle;

a carrier device having the load holder for carrying a load behind the vehicle;

a carrier device having the load holder for carrying a load behind the vehicle in a load carrying position of the carrier device;

a pivot arrangement connecting the carrier device to the rack, the carrier device and the load holder being pivotal upwardly from the load carrying position to an elevated position not interfering with the opening of the rear door or the trunk lid:

spring means provided for holding the carrier device in the load carrying position of the carrier device, for assisting in the upward pivotal movement of the load carrier once this movement has passed the lowermost portion thereof and for holding the carrier device in the elevated position;

the carrier device comprising at least one arm that extends from behind up over the rear portion of the vehicle roof, said arm being pivotably connected to the rack; and said rack comprising at least one rail extending in the longitudinal direction of the vehicle, at least one arm being provided, said at least one rail having upwardly open recesses for receiving, in the load carrying position of the carrier device, at least partially a front end portion of said at least one arm.

21. A load carrier arrangement for mounting a load holder on a vehicle, said vehicle having a roof and a rear door or a trunk lid, comprising:

a rack disposed across the roof of the vehicle, said rack being fastened to the vehicle;

a carrier device having the load holder for carrying a load behind the vehicle;

a carrier device having the load holder for carrying a load behind the vehicle in a load carrying position of the carrier device;

a pivot arrangement connecting the carrier device to the rack, the carrier device and the load holder being pivotal upwardly from the load carrying position to an elevated position not interfering with the opening of the rear door or the trunk lid;

spring means provided for holding the carrier device in the load carrying position of the carrier device, for assisting in the upward pivotal movement of the load carrier once this movement has passed the lowermost portion thereof and for holding the carrier device in the elevated position; and the rack including forward and rear strut extending over the vehicle roof, the strut being mutually interconnected in the, longitudinal direction of the vehicle by at least one longitudinal portion.

* * * * *